United States Patent
Iisaka et al.

(10) Patent No.: US 6,546,118 B1
(45) Date of Patent: Apr. 8, 2003

(54) IMAGE PROCESSING APPARATUS FOR VEHICLE

(75) Inventors: Atsushi Iisaka, Osaka (JP); Nobuhiko Yasui, Osaka (JP)

(73) Assignee: Matsushita Electronic Industrial Co., Ltd., Osaka (JP)

( * ) Notice: Subject to any disclaimer, the term of this patent is extended or adjusted under 35 U.S.C. 154(b) by 0 days.

(21) Appl. No.: 09/228,401

(22) Filed: Jan. 12, 1999

(30) Foreign Application Priority Data

Jan. 12, 1998  (JP) .......................................... 10-003787

(51) Int. Cl.⁷ .............................. G06K 9/00; H04N 7/00
(52) U.S. Cl. ........................ 382/104; 348/119; 340/907
(58) Field of Search ................................ 382/103, 104, 382/106, 113, 268, 300; 315/82; 244/185; 348/118, 169, 148–149, 135, 164; 701/28; 340/903, 932.2, 425.5, 435, 476

(56) References Cited

U.S. PATENT DOCUMENTS

| | | | |
|---|---|---|---|
| 5,596,494 A | * | 1/1997 | Kuo ............................ 364/420 |
| 5,638,116 A | * | 6/1997 | Shimura et al. ............ 348/118 |
| 5,716,032 A | * | 2/1998 | McIngvale ................... 244/185 |
| 5,790,403 A | * | 8/1998 | Nakayama ..................... 701/28 |
| 5,922,036 A | * | 7/1999 | Yasui et al. ..................... 701/28 |
| 6,049,171 A | * | 4/2000 | Stam et al. .................... 315/82 |
| 6,285,393 B1 | * | 9/2001 | Shimoura et al. ........... 348/119 |

FOREIGN PATENT DOCUMENTS

| | | |
|---|---|---|
| JP | 03137798 | 6/1991 |
| JP | 05151340 | 6/1993 |

* cited by examiner

*Primary Examiner*—Bhavesh M. Mehta
*Assistant Examiner*—Aaron Carter
(74) *Attorney, Agent, or Firm*—Wenderoth, Lind & Ponack, L.L.P.

(57) ABSTRACT

An image processing device for a vehicle according to the present invention has an edge extractor for emphasizing edges of a traffic lane in a front road image signal generated by a digital image pick-up device, a threshold setter for setting a threshold to extract the edges of the traffic lane based on the result detected by the edge extractor, an outline extractor for extracting an outline of the traffic lane to generate an outline data based on the result detected by the edge extractor and the threshold set by the threshold setter, a noise eliminator for eliminating noise components from the outline data, a white line detector for detecting lane-indicating lines based on the outline data from which the noise components have been eliminated, an attitude change detector for estimating the attitude of the vehicle based on the detected lane-indicating lines, and a target advance direction detector for detecting a target direction to advance the vehicle based on the result obtained by the white line detector and the estimated attitude of the vehicle. According to the image processing apparatus, the target direction to advance the vehicle can be exactly measured, even if the helix angle (i.e. pitch angle) changes.

16 Claims, 7 Drawing Sheets

| 1 | 1 | 1 | 0 | −1 | −1 | −1 |
|---|---|---|---|---|---|---|

IMAGE PROCESSING APPARATUS FOR VEHICLE

FIELD OF THE INVENTION

The present invention relates to an image processing apparatus for a vehicle. More particularly, it relates to the image processing apparatus which is used, for example, as a steering controller of an unmanned automated vehicle or the like, for controlling the vehicle so that the vehicle detects lane markers (lane-indicating lines) on a road so as to track the lane markers.

DESCRIPTION OF THE PRIOR ART

In recent years, there prevails an image processing apparatus for a vehicle, which is carried on the vehicle, the apparatus being adapted to be capable of photographing a foreground in the vehicle-moving direction so as to obtain an image which corresponds to the foreground, processing the image, and then obtaining various information which is required to drive the vehicle or to control a steering device of the vehicle. More concretely, for example, there has been generally known an image processing apparatus, which is adapted to be capable of photographing the road in front of the vehicle to obtain an original image by using a digital image pick-up device, extracting an image, which corresponds to lane markers, from the original image, detecting position or attitude of the vehicle in the traffic lane based on the image of the lane markers, and then deciding target advance direction of the vehicle based on the detected result (for example, see Japanese Laid-open Patent Publication No. 3-137798).

Thus, in the conventional image processing apparatus which is disclosed in Japanese Laid-open Patent Publication No. 3-137798, for example, the image is processed so as to detect the position or attitude of the vehicle in the traffic lane, on the assumption that the helix angle (i.e. pitch angle) of the image pick-up device or vehicle is constant and further the height of the image pick-up device or vehicle against the road surface is constant (Hereinafter, this height is referred to "image pick-up height".). Therefore, if the helix angle (i.e. pitch angle) or image pick-up height changes or fluctuates when the vehicle is moving, there may occur such a problem that error is accompanied with the detected position or attitude of the vehicle in the traffic lane. Thus, in order to solve the problem, there has been proposed an image processing apparatus, which is adapted to be capable of approximately expressing white lines in the vicinity of the vehicle in the original image photographed by the image pick-up device as a straight line so as to obtain a vanishing point (FOE), measuring the change of the helix angle (i.e. pitch angle) or image pick-up height based on the vanishing point, and then detecting the position or attitude of the vehicle in the traffic lane based on the change measured above (for example, see Japanese Laid-open Patent Publication No. 5-151340).

However, in the conventional image processing apparatus which measures the change of the helix angle (i.e. pitch angle) or image pick-up height based on the vanishing point, there exists such a problem that although the change of the helix angle (i.e. pitch angle) or image pick-up height of the vehicle can be exactly measured when each of the lane markers is approximately expressed as a straight line, the change of the helix angle (i.e. pitch angle) or image pick-up height cannot be exactly measured so that the position or attitude of the vehicle in the traffic lane cannot be exactly detected when each of the lane markers is expressed as a curved line, for example, due to winding of the road, because the vanishing point cannot be exactly detected.

SUMMARY OF THE INVENTION

The present invention has been developed to solve the conventional problems described above, and has an object of providing an image processing apparatus for a vehicle, which can exactly measure the change of the helix angle (i.e. pitch angle) of the vehicle or movement of the vehicle in the upper-lower direction (change of the image pick-up height) so as to be able to exactly detect the position or attitude of the vehicle in the traffic lane, even if each of the lane markers is expressed as a curved line.

According to the present invention which is achieved to solve the above-mentioned problems, there is provided an image processing apparatus for a vehicle, which is carried on the vehicle, the apparatus including, (a) an image pick-up device for photographing a foreground (a road and a scene around the road) in a vehicle-moving direction to generate an original image data which corresponds to the foreground, (b) an outline extracting device for extracting an outline image data from the original image data generated by the image pick-up device, the outline image data corresponding to outlines of two lane-indicating lines (lane markers) formed at both end portions in a width direction of a traffic lane on a road, on which the vehicle is moving, (c) a coordinate transforming device for performing a coordinate-transforming processing to the outline image data generated by the outline extracting device to generate a coordinate-transforming image data which represents a plan view of the outlines of the lane-indicating lines in a predetermined plane coordinate system, and (d) an attitude change detecting device for detecting a change of a helix angle (i.e. pitch angle) of the vehicle based on such a matter that the two lane-indicating lines are parallel to each other, by using the coordinate-transforming image data generated by the coordinate transforming device.

According to the image processing apparatus, from the image of the lane-indicating lines, a plane view of the lane-indicating lines (outlines) is formed by the coordinate transforming device. Because both lane-indicating lines, located at both end portions of the traffic lane respectively, are parallel to each other, the images of both lane-indicating lines are parallel to each other on the plan view, if the helix angle (i.e. pitch angle) of the vehicle is constant. However, if the helix angle (i.e. pitch angle) changes, the images of the lane-indicating lines are not parallel to each other on the plan view. For example, if the helix angle (i.e. pitch angle) or image pick-up height changes so that the position, where the optical axis of the image pick-up device crosses with the road surface, deviates forward from the normal position, the interval between the lane-indicating lines on the plan view becomes narrower as the position shifts forward. On the other hand, if the position, where the optical axis of the image pick-up device crosses with the road surface, deviates backward from the normal position, the interval between the lane-indicating lines on the plan view becomes wider as the position shifts forward. Therefore, the change of the helix angle (i.e. pitch angle) or image pick-up height can be measured based on the change of the interval of the lane-indicating lines on the plan view. Thus, in the image processing apparatus, if the lane-indicating lines (lane markers) are curved, the change of the helix angle (i.e. pitch angle) or image pick-up height can be detected by the attitude change detecting device, based on the change of the interval of the lane-indicating lines on the plan view. In consequence, the position or attitude of the vehicle in the traffic lane can be exactly detected.

In the image processing apparatus, it is preferable that (e) the plane coordinate system used by the coordinate transforming device is a plane coordinate in which a position of the image pick-up device is defined as an origin in a view point of plane, a width direction of the vehicle is defined as a first coordinate axis (X-axis), and a front-rear direction of the vehicle is defined as a second coordinate axis (Z-axis). Further, it is preferable that (f) the attitude change detecting device plots a plurality of points onto the plane coordinate, based on the coordinate-transforming image data, the position of each of the points in the first coordinate axis corresponding to the size in width of the traffic lane, and the position of the point in the second coordinate axis corresponding to the position in the longitudinal direction of the traffic lane. Moreover, it is preferable that the attitude change detecting device decides one straight line which matches or fits the points, and then detects the change of the helix angle (i.e. pitch angle) or the change of the amount of the movement of the vehicle in the upper-lower direction (the change of the image pick-up height), based on the inclination angle of the straight line against the second coordinate axis. In that case, the change of the helix angle (i.e. pitch angle) or image pick-up height can be easily measured by means of such a simple operation that nothing is required except calculation of the angle between the above-mentioned straight line and the second coordinate axis.

Further, it is more preferable that the image processing apparatus is provided with a target advance direction detecting device for detecting a target direction to advance the vehicle in consideration of at least one of the change of the helix angle (i.e. pitch angle) and the amount of movement of the vehicle in the upper-lower direction. In that case, the direction, along which the vehicle should be advanced or can be advanced, can be detected, and consequently the information can be effectively utilized for an automated steering device and so on.

Meanwhile, in the image processing apparatus, it is preferable that the attitude change detecting device judges outline points deviating from the above-mentioned straight line to be noises. In that case, because the noises are eliminated, the accuracy of measurement of the change of the helix angle (i.e. pitch angle) or image pick-up height may be improved.

The outline detecting device of the image processing apparatus, for example, may be concretely composed of (g) an edge extracting device for emphasizing edges of the traffic lane in the original image data generated by the image pick-up device, (h) a threshold setting device for setting a threshold to extract the edges of the traffic lane based on the result detected by the edge extracting device, (i) an outline point extracting device for extracting a pixel, whose intensity is a peek value, from pixels of the edges of the traffic lane, as an outline point data of the lane-indicating lines, based on both of the result detected by the edge extracting device and the threshold set by the threshold setting device, and (j) a lane-indicating line detecting device for performing an interpolation processing to the outline point data extracted by the outline point extracting device to generate the outline image data which corresponds to the outline of the lane-indicating lines.

BRIEF DESCRIPTION OF THE DRAWINGS

These and other objects, features and advantages of the present invention will become clear from the following description taken in conjunction with the preferred embodiments with reference to the accompanying drawings.

DETAILED DESCRIPTION OF THE PREFERRED EMBODIMENTS

Hereinafter, preferred embodiments of the present invention will be concretely described.

Figure 1A:
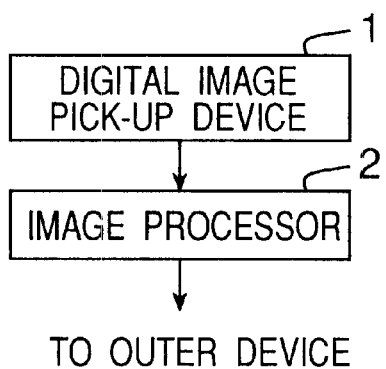
FIG. 1A is a block diagram showing a construction of an image processing apparatus for a vehicle according to the present invention.

FIG. 1A is a block diagram showing a fundamental construction of an image processing apparatus for a vehicle according to the present invention. As shown in FIG. 1A, the image processing apparatus is provided with a digital image pick-up device 1, and an image processor 2 (an image processing section) for processing an original image photographed (picked up) by the digital image pick-up device 1. Hereupon, the digital image pick-up device 1, which is carried (loaded) on a front portion of the vehicle while facing the foreground, is adapted to photograph a road image (foreground) in front of the vehicle so as to generate a digital image signal. Meanwhile, the image processor 2, which is composed of a microcomputer for example, is adapted to perform a predetermined image processing to the digital original image signal (video signals) outputted from the digital image pick-up device 1 so as to detect its moving route or the like, along which the vehicle should be advanced or can be advanced. The resultant data detected by the image processor 2 is sent to an outer device such as a vehicle controller or the like, which is not shown, and then used for automated steering control or automated moving control thereby.

Figure 1B:
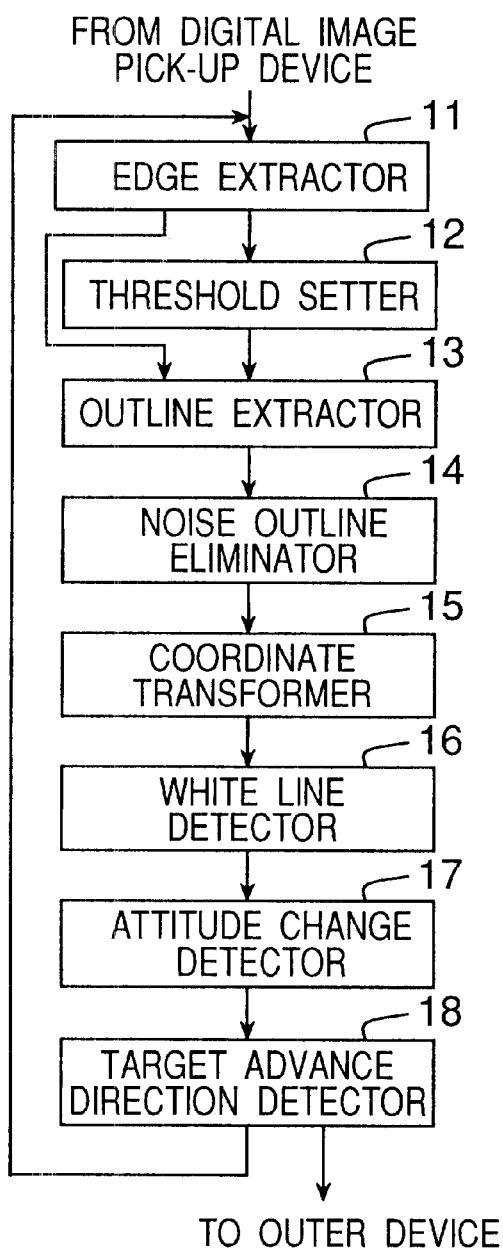
FIG. 1B is a block diagram showing a construction of an image processor in the image processing apparatus shown in FIG. 1A.

FIG. 1B is a block diagram showing a concrete construction of the image processor 2 as described below.

The digital image pick-up device 1 can successively obtain the original image of the object, which is composed of a pixel matrix of Ph X Pv, wherein Ph and Pv are numbers of pixels on a screen in the horizontal direction (transverse direction) and vertical direction (longitudinal direction), respectively. Hereupon, if the numbers of the pixels Ph and Pv are increased, the accuracy of the operation or the like for detecting a target direction to advance the vehicle is improved, because resolution of the image is improved. However, if the numbers of the pixels are increased, there occurs such a problem that the manufacturing cost rises. Therefore, the numbers of the pixels Ph and Pv should be decided according, to circumstances in response to the required resolution and the manufacturing cost. In the present embodiment, although Ph and Pv are set to 640 and 255, as one example, respectively, they are of course not limited to the above-mentioned values.

Figure 2:
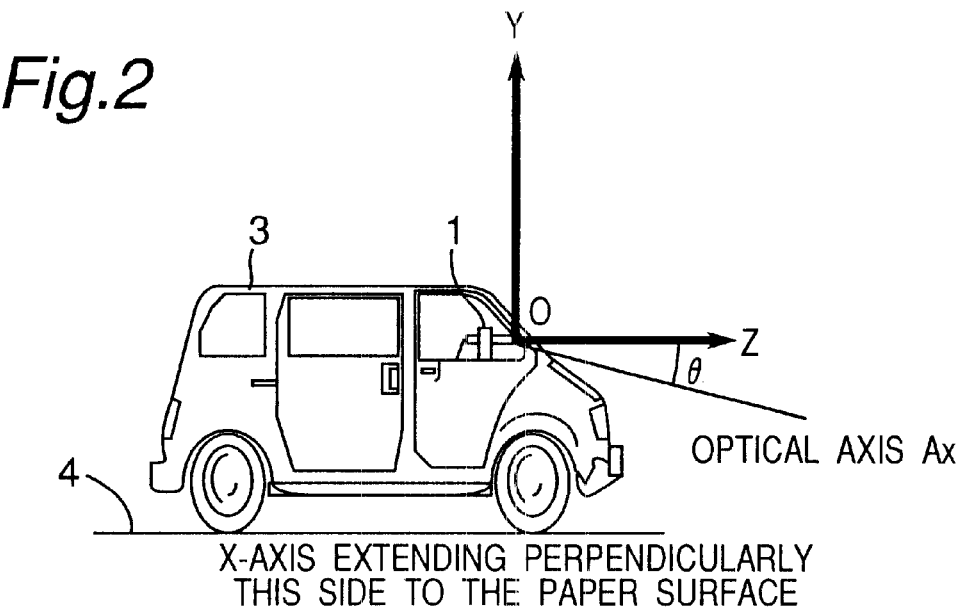
FIG. 2 is a side view of a vehicle on which the image processing apparatus according to the present invention is carried.

FIG. 2 is a side view of a vehicle 3 (automobile) on which the digital image pick-up device 1 and the image processor 2 according to the present invention are carried. Hereinafter, the positional relationship in a three dimensional space around the vehicle 3 will be expressed using a spatial coordinate system (Hereinafter, it will be referred to as "X-Y-Z spatial coordinate system".), in which the position of the digital image pick-up device 1 is defined as the origin O. Further, the axis extending in the left-right direction (width direction) of the vehicle 3 through the origin O is defined as the X-axis. Moreover, the axis extending in the upper-lower direction of the vehicle 3 through the origin O is defined as the Y-axis. In addition, the axis extending in the front-rear direction of the vehicle 3 through the origin O is defined as the Z-axis. Hereupon, in the X-Y-Z spatial coordinate system, the right side of the X-axis, the upper side of the Y-axis and the front side of the Z-axis are defined as the positive directions, respectively.

As shown in FIG. 2, the optical axis Ax of the digital image pick-up device 1 is set as follows. Namely, it is set to coincide with such a direction that the vehicle 3 moves on a road 4 in the plane view, namely Z-axis direction, when the vehicle 3 stands in a normal attitude (Namely, the vehicle 3 is not accompanied with change of the helix angle (i.e. pitch angle) and movement in the upper-lower direction.). Further, it is set to downwardly incline toward the front direction with a predetermined angle θ against the horizontal direction (Z-axis direction) in the elevation view (Hereinafter, the angle θ is referred to "optical axis inclination θ".). Hereupon, as the digital image pick-up device 1, there may be used such a device having a view angle (angle of view), in which the road surface between the position of about 5 meters ahead of the vehicle 3 and the infinite position in the Z-direction can be included in the original image obtained by the device. Further, the optical axis inclination θ of the digital image pick-up device 1 is preferably set to such a manner that the road surface between the position of about 5 meters ahead of the vehicle 3 and the infinite position can be photographed.

Figure 3:
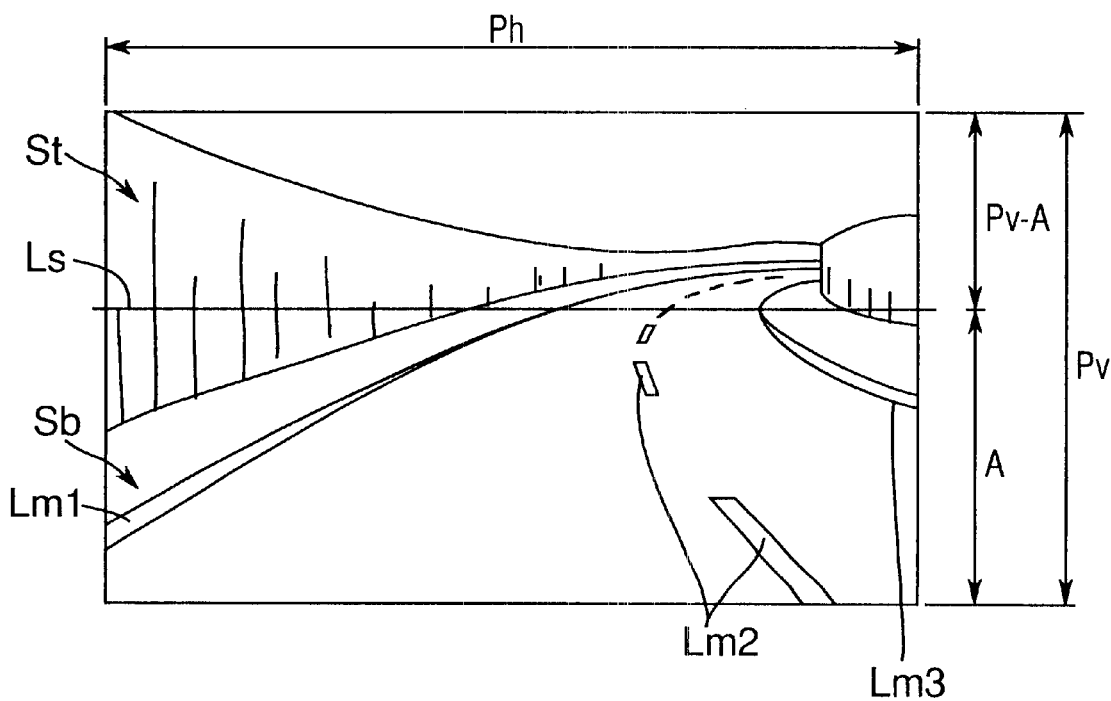
FIG. 3 is a view showing an example of an original image photographed by a digital image pick-up device shown in FIG. 1A.

In FIG. 3, there is shown an example of the original image of the foreground of the vehicle, which is photographed by the digital image pick-up device 1. As apparent from FIG. 3, the road 4, on which the vehicle 3 is moving, is provided with two traffic lanes. Namely, it is partitioned into the two traffic lanes disposed in the left-right direction, with three lane-indicating lines Lm1, Lm2 and Lm3 (lane markers). Hereupon, the vehicle 3 is moving on the left traffic lane of the road 4 with two traffic lanes. These lane-indicating lines Lm1, Lm2 and Lm3 are generally drawn on the road surface using white or yellow paint.

Hereupon, in FIG. 3, Sb, St and Ls signify a roadside zone, a side wall of the road (sound insulating wall) and an upper limit of the region which is image processed, respectively. That is, because the region above Ls is considerably far away from the vehicle 3 (for example, farther than 70 meters ahead), it is excluded from the object of the image processing. Further, "A" denotes the number of scanning lines below Ls.

Figures 4, 5:
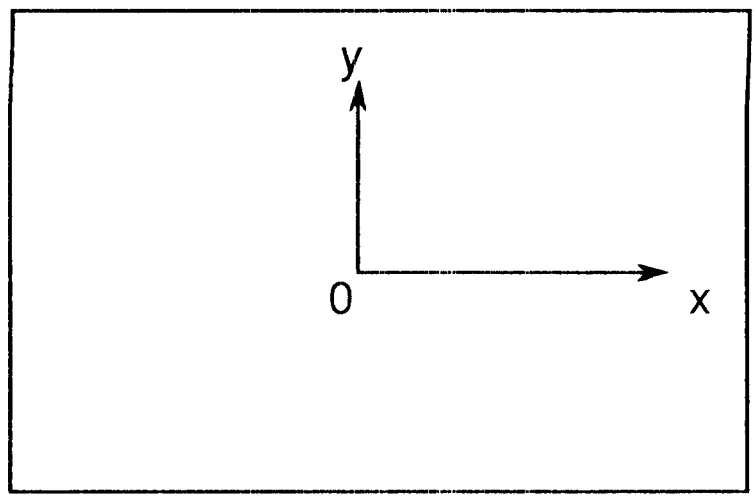
FIG. 4 is a view showing a coordinate system applied to the original image shown in FIG. 3.
FIG. 5 is a view showing construction of a spatial filter.

Hereinafter, as shown in FIG. 4, the positional relationship in the plane original image (or the screen representing the original image) photographed by the digital image pick-up device 1 will be expressed using a plane coordinate system (Hereinafter, it will be referred to as "x-y plane coordinate system".), wherein the point at which light introduced into the digital image pick-up device 1 along the optical axis Ax focuses into image, namely the center point of the original image (screen) is defined as the origin o. Further, the axis extending in the horizontal direction (transverse direction) of the image through the origin o is defined as the x-axis. Moreover, the axis extending in the vertical direction (upper-lower direction) of the image through the origin o is defined as the y-axis. Hereupon, in the x-y plane coordinate system, the right side of the x-axis and the upper side of the y-axis are defined as the positive directions, respectively.

Hereinafter, a concrete construction of the image processor 2 will be described.

As shown in FIG. 1B, the image processor 2 is provided with an edge extractor 11 (edge extracting device), a threshold setter 12 (threshold setting device), an outline extractor 13 (outline extracting device), a noise outline eliminator 14 (noise outline eliminating device), a coordinate transformer 15 (coordinate transforming device), a white line detector 16 (white line detecting device), an attitude change detector 17 (attitude change detecting device) and a target advance direction detector 18 (target advance direction detecting device).

Hereupon, the edge extractor 11, which is connected to the digital image pick-up device 1, receives the digital image signal (original image) of the image of the fore road, the signal being outputted from the digital image pick-up device 1. Then, the edge extractor 11 performs a filtering treatment to the digital image signal, which is sent thereto from the digital image pick-up device 1, using a spatial filter shown in FIG. 5 so as to emphasize (or extract) pixels whose brightness steeply changes in the original image.

As shown in FIG. 5, the spatial filter has a construction of one-dimensional arrangement. Further, in the spatial filter, odd number of filter elements are aligned in the direction along which scanning lines of the original image extend, each of the filter elements having a respective parameter. Hereupon, the parameter of the filter element located at the center of the spatial filter is set to 0, the parameter of each of the filter elements located at left side as compared with the center element is set to 1, and further the parameter of each of the filter elements located at right side as compared with the center element is set to −1. As apparent from FIG. 5, in the present embodiment, the spatial filter having seven filter elements is used as an example. However, the number of the filter elements may be set to a preferable value in such a manner that the edges of the white lines are emphasized while very little brightness changing of the image except the white line is hardly emphasized, in response to the number of the pixels in the direction along which the white line represented in the original image is scanned. Hereupon, the spatial filter is not limited to a filter of one-dimensional arrangement. The filtering treatment using the spatial filter is performed to the whole original image which is sent from the digital image pick-up device 1 to the edge extractor 11, thereby an image in which edges are emphasized (Hereinafter, the image is referred to "edge emphasized image".) is generated.

The threshold setter 12, which is connected to the edge extractor 11, receives the edge emphasized image which is outputted from the edge extractor 11. Further, the threshold setter 12 sets a threshold to effectively extract the pixels of the edges in the outline portion of the lane-indicating lines Lm1–Lm3 from the edge emphasized image. Hereupon, the threshold is individually set with respect to each of the left portion and right portion of the image. Thus, the threshold $EthL(y)$ of the left portion of the image and the threshold $EthR(y)$ of the right portion of the image are set at every scanning line according to Equations 1 and 2 described below, respectively. Hereupon, the positional relationship in the image is represented using the x-coordinate and y-coordinate in the x-y plane coordinate system as shown in FIG. 4, as described previously.

$$EthL(y)=C \cdot EmaxL(y)+(1-C) \cdot EmeanL(y) \quad \text{Equation 1}$$

$$EthR(y)=C \cdot EminR(y)+(1-C) \cdot EmeanR(y) \quad \text{Equation 2}$$

Figure 6A:
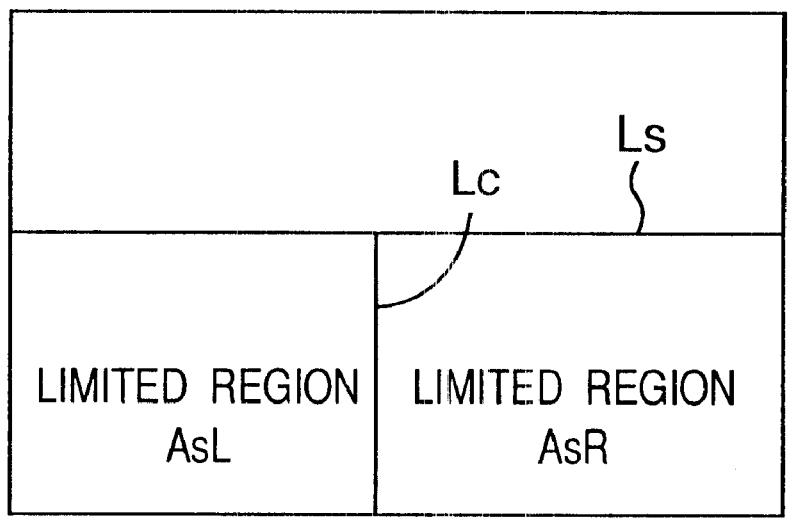
FIGS. 6A and 6B are views, each of which shows a method of dividing the original image shown in FIG. 3 into several regions.
Figure 6B:
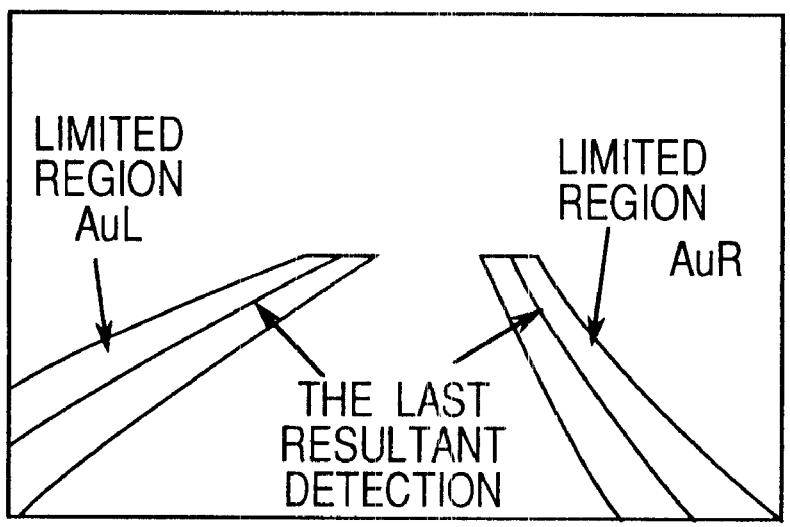

Hereupon, $EmaxL(y)$ and $EmeanL(y)$ in Equation 1 signify the maximum edge intensity of the scanning line at the position of y and the average edge intensity of the pixels showing positive edge intensity at the position of y, respectively, with respect to the edge emphasized image in the predetermined left limited region which is shown, for example, as AsL or AuL in FIGS. 6A and 6B.

Further, $EminR(y)$ and $EmeanR(y)$ in Equation 2 signify the minimum edge intensity of the scanning line at the position of y and the average edge intensity of the pixels showing negative edge intensity at the position of y, respectively, with respect to the edge emphasized image in the predetermined right limited region which is shown, for example, as AsR or AuR in FIGS. 6A and 6B.

In addition, C in Equation 1 or 2 signifies a predetermined constant number which may be larger than 0 and smaller than 1. Hereupon, C is set to 0.6 in the present embodiment.

The outline extractor 13, which is connected to both of the edge extractor 11 and the threshold setter 12, receives the edge emphasized image and the threshold from the edge extractor 11 and the threshold setter 12, respectively. Thus, based on the thresholds $EthL(y)$ and $EthR(y)$, the outline extractor 13 extracts outline points of the lane-indicating lines defining the traffic lane, from the pixels within the left limited region and right limited region in the edge emphasized image, for example, shown in FIGS. 6A and 6B, respectively. The extraction process of the outline points is performed by scanning each of the limited regions outwardly from the inner side end portion of the region in the image.

Figure 7:
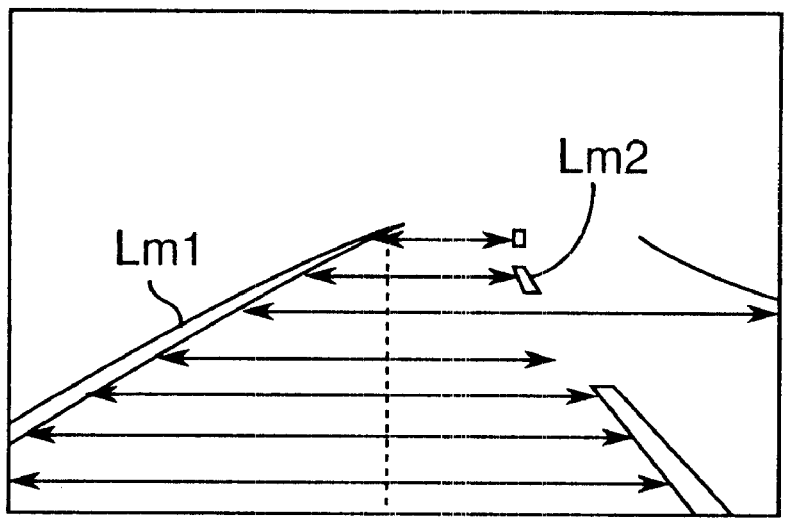
FIG. 7 is a view showing a method of scanning the original image.

As shown in FIG. 7, the extraction of the outline points within the left limited region in the image, which is performed to extract the outline points of the left lane-indicating line Lm1 (white line) of the traffic lane on which the vehicle 3 is moving, is generally achieved according to the following procedure. That is, the procedure includes the steps of scanning the limited region leftward from the right end thereof, detecting a pixel which expresses edge intensity larger than the threshold $EthL(y)$ at first, and continuing the scanning step if the edge intensity further increases. Thus, if the edge intensity of a left pixel scanned newly is smaller than that of the pixel scanned last, the newly scanned pixel is defined as the outline point. That is, because the edge of the lane-indicating line has some extent of width, the peek is detected as the outline point.

On the other hand, the extraction of the outline points within the right limited region in the image, which is performed to extract the outline points of the right lane-indicating line Lm2 (white line) of the traffic lane on which the vehicle 3 is moving, is generally achieved according to the following procedure. That is, the procedure includes the steps of scanning the limited region rightward from the left end thereof, detecting a pixel which expresses edge intensity smaller than the threshold $EthR(y)$ at first, and continuing the scanning step if the edge intensity further decreases. Thus, if the edge intensity of a right pixel scanned newly is larger than that of the pixel scanned last, the newly scanned pixel is defined as the outline point.

Figure 8:
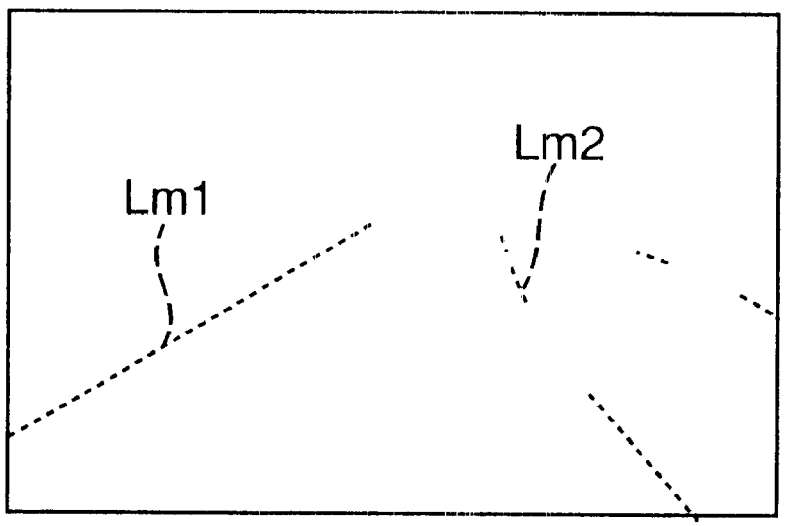
FIG. 8 is a view showing an outline image of lane-indicating lines, which is extracted from the original image.

In FIG. 8, there is shown an example of the outline points detected according to the above-mentioned procedure. Thus, the outline extractor 13 generates the outline extraction signal signifying the outline points of the lane-indicating lines.

FIGS. 6A and 6B described above represent the limited regions to which the threshold setting process and the outline extracting process are performed, respectively. Hereupon, FIG. 6A represents the region which is set directly after the image processing apparatus has begun its operation. As shown in FIG. 6A, the image is partitioned into the left limited region AsL and the right limited region AsR by the center line Lc extending in the vertical direction within the region below the horizontal line Ls (see FIG. 3) representing the upper limit of image processing. In the edge emphasized image, the center line Lc is located at the center position in the x-axis direction. Therefore, in the horizontal direction, the length of each limited region is represented as Ph/2. However, the location of the center line Lc extending in the vertical direction is not limited to the above-mentioned position.

The noise outline eliminator 14, which is connected to the outline extractor 13, receives the outline extraction signal (outline points) which is outputted from the outline extractor 13. Further, the noise outline eliminator 14 performs a treatment, which is referred to as clustering, to bring some outline points to a group, the points existing at intervals within a predetermined distance Dc to one another in the outline points extracted by the outline extractor 13. Then, outline points, which are isolated (independent) from the group, are eliminated as noise outline points. Hereupon, Dc is set to such a preferable value that outline points on the successive lane-indicating lines defining the curved traffic lane belong to one group, while noise outline points do not belong to the group in which the outline points on the lane-indicating line are included.

The coordinate transformer 15, which is connected to the noise outline eliminator 14, receives an image data corresponding to the outline points of the lane-indicating line, from which noise outline points have been eliminated (performed with clustering), the data being outputted from the noise outline eliminator 14. Further, the coordinate transformer 15 performs such a coordinate transformation that the x-y plane coordinate system on which the outline data of the lane-indicating line is represented, is changed to a plane coordinate system which expresses real distance. That is, the outline points on the x-y coordinate system shown in FIG. 4 are transformed to those on the plane coordinate system (Hereinafter, it is referred to as "X-Z plane coordinate system".) which is obtained by fixing the position in the Y-axis direction at the road surface in the X-Y-Z spatial coordinate system shown in FIG. 3.

Figure 11:
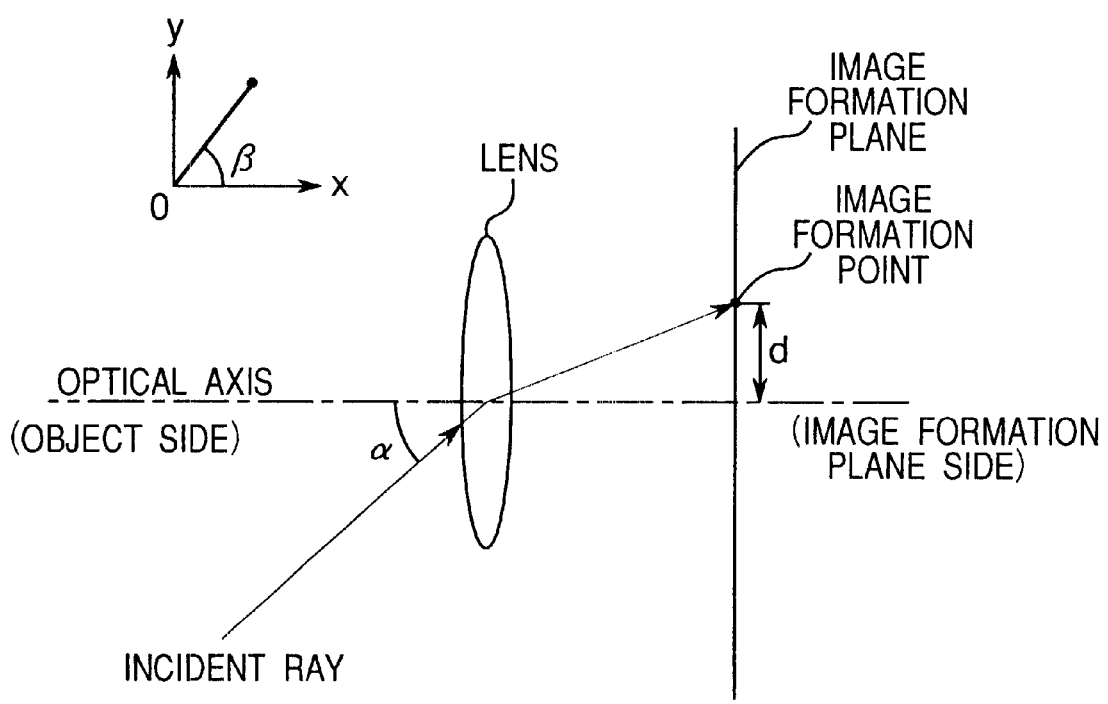
FIG. 11 is a schematic view of an optical system in the digital image pick-up device, while showing a method of obtaining optical property data of a lens.

In the transformation, there may be used optical property data of a lens in the digital image pick-up device 1. The optical property data will be described below with reference to FIG. 11. FIG. 11 represents an optical system of the digital image pick-up device 1. In the figure, it is represented that when an incident ray from an object to be photographed is introduced to a lens with an angle α against the optical axis of the lens, an image formation point is located at a position apart from the center of an image formation plane (point on the optical axis) with the distance d. The optical property data, which is a data for relating the incident angle α with the distance d, is decided when the specification of the lens is designed.

When the coordinate transformation is performed, at first d is sought with respect to the points on the x-y plane. In order to seek d with respect to the x-y plane, the ratio of the image size to the CCD size (effective image pick-up plane size) is used. Then, a straight line, which represents the incident direction on the X-Y-Z spatial coordinate system, is decided based on the incident angle α and angle β (angle formed by the x-axis and a straight line which extends through the point corresponding to the image formation point and the origin on the image) corresponding to the distance d. A transformed coordinate is obtained based on the point in which the straight line crosses with the X-Z plane (plane of Y=−H). H is the distance from the ground surface to the center of the lens of the digital image pick-up device 1.

If the optical property data of the lens can not be obtained, the coordinate transformation may be performed using Equations 3 to 5 described below.

$X = (x/F) \cdot (Z\cos\theta - Y\sin\theta)$  Equation 3

$Z = Y \cdot (F\cos\theta + y\sin\theta)/(y\cos\theta - F\sin\theta)$  Equation 4

$Y = -H$  Equation 5

In Equations 3 to 5, F means the focal distance of the lens in the digital image pick-up device 1, θ means the optical axis inclination, namely the angle which is formed by the Z-axis and the optical axis Ax of the digital image pick-up device 1 (camera), and H means the height of the digital image pick-up device 1 with respect to the road surface.

The white line detector 16, which is connected to the coordinate transformer 15, receives the outline point data of the lane-indicating lines in the X-Z plane coordinate system, the data being outputted from the coordinate transformer 15. Thus, the white line detector 16 detects the outline of the lane-indicating lines in the X-Z plane coordinate system.

Figure 9:
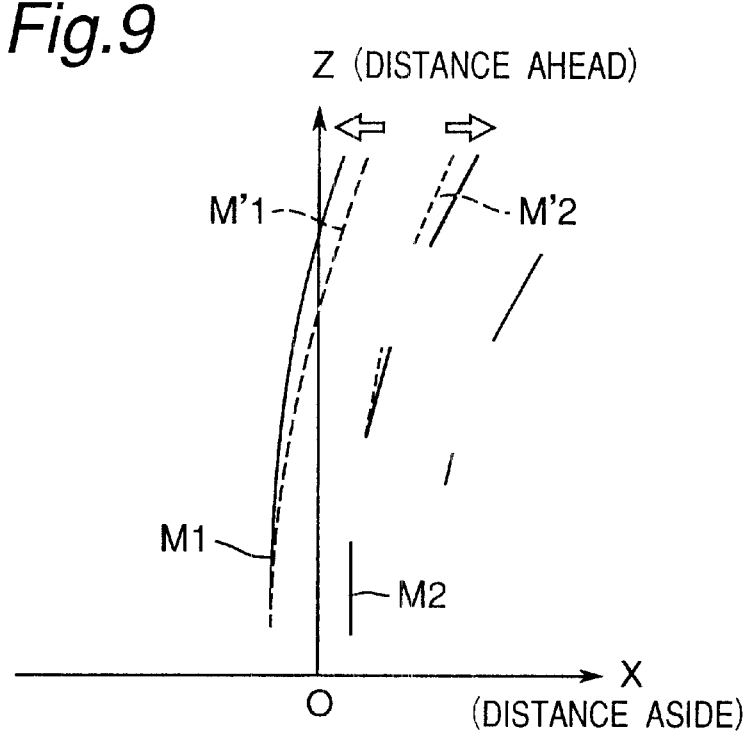
FIG. 9 is a view showing the outline image of the lane-indicating lines, the outline image being processed by using coordinate-transforming processing in which x-y plane coordinate system is changed to X-Z plane coordinate system.

In FIG. 9, there is shown an example of the outline of the lane-indicating lines in the X-Z plane coordinate system, the outline being detected by the white line detector 16. In FIG. 9, M1 represents the outline of the left lane-indicating line of the traffic lane on which the vehicle 3 is moving, and M2 represents the outline of the right lane-indicating line of the traffic lane. Hereupon, if the change of the helix angle (i.e. pitch angle) or the movement in the upper-lower direction (change of the image pick-up height) does not occur in regard to the vehicle 3, the interval between the left and right lane-indicating lines, namely the width of the traffic lane, is constant, as indicated by M'1 and M'2 in FIG. 9. That is, the outline M'1 of the left lane-indicating line and the outline M'2 of the right lane-indicating line are parallel to each other. However, if the change of the helix angle (i.e. pitch angle) or the movement in the upper-lower direction (change of image pick-up height) occurs in regard to the vehicle 3, the outlines M'1, M'2 of the left and right lane-indicating lines are not parallel to each other. For example, if the position, where the optical axis Ax of the digital image pick-up device 1 crosses with the road surface, deviates forward from the normal position due to the change of the helix angle (i.e. pitch angle) or the movement in the upper-lower direction of the vehicle 3, the interval between the outlines M1, M2 of both of the lane-indicating lines (width of the traffic lane) becomes narrower as the value of Z-coordinate becomes larger. Meanwhile, if the position deviates backward, the interval between the outlines M1, M2 of both of the lane-indicating lines becomes wider as the value of Z-coordinate becomes larger. Thus, in the example shown in FIG. 9, because the interval between the outlines M1, M2 of the left and right lane-indicating lines becomes wider as the value of Z-coordinate becomes larger, it would be understood that the position, where the optical axis Ax of the digital image pick-up device 1 crosses with the road surface, deviates backward from the normal position.

Therefore, change of the helix angle (i.e. pitch angle) or the movement in the upper-lower direction of the vehicle 3 can be measured based on the change of the interval of the outlines M1, M2 of both of the lane-indicating lines in the X-Z plane coordinate system. Hereupon, the change of the helix angle (i.e. pitch angle) or the movement in the upper-lower direction is detected by the attitude change detector 17, as described below.

Figure 10:
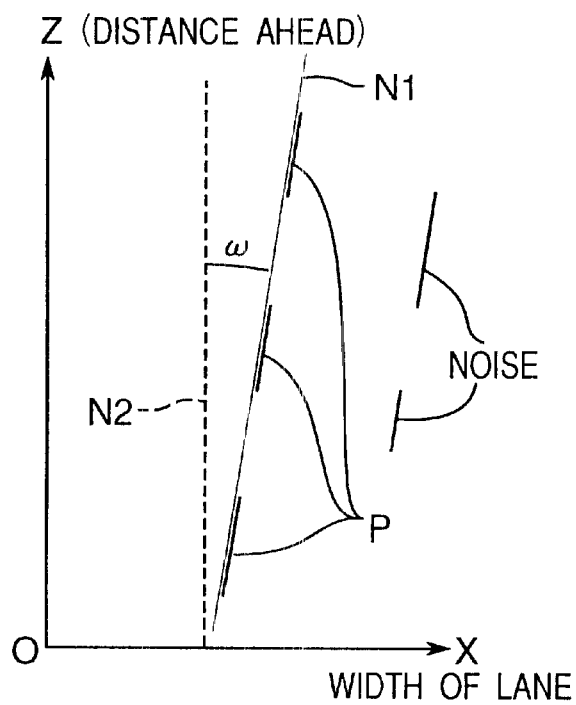
FIG. 10 is a view showing change of width of a traffic lane in the Z-direction, the view being obtained by processing the outline image shown in FIG. 9.

The attitude change detector 17, which is connected to the white line detector 16, receives the outline data of the lane-indicating lines in the X-Z plane coordinate system, the data being outputted from the white line detector 16. Further, as shown in FIG. 10, the attitude change detector 17 processes the outline data of the lane-indicating lines, and then plots the points onto the X-Z plane coordinate system, the X-coordinate of each of the points corresponding to the width of the traffic lane (lane width), and the Z-coordinate of the point corresponding to the position of the traffic lane in the extending direction thereof. Then, the attitude change detector sets one straight line N1 which fits (or matches) the plotted points P. Hereupon, the straight line N1, for example, can be easily decided using the least square method, the Hough transformation method or the like, each of which is well known.

Then, the attitude change detector 17 detects the angle ω which is formed by the straight line N1 and the straight line N2 parallel to the Z-axis. Hereupon, the straight line N2, which is parallel to the Z-axis, crosses with the straight line N1 at the position of Z=0. Thus, if the change of the helix angle (i.e. pitch angle) or the movement in the upper-lower direction does not occur in regard to the vehicle 3, the plotted points P substantially coincide with the straight line N2. Further, the attitude change detector 17 detects the change of the helix angle (i.e. pitch angle) or the movement in the upper-lower direction in regard to the vehicle 3, based on the angle ω.

The target advance direction detector 18, which is connected to the attitude change detector 17, receives the change of the helix angle (i.e. pitch angle) or movement in the upper-lower direction of the vehicle 3, which is outputted from the attitude change detector 17. Further, the target advance direction detector 18 detects the position or attitude of the vehicle 3 in the traffic lane, based on the change of the helix angle (i.e. pitch angle) or the movement in the upper-lower direction of the vehicle 3. Moreover, it detects the direction along which the vehicle 3 should be advanced or can be advanced, and then outputs it to outer devices such as an automated steering device or the like.

Thus, according to the image processing apparatus, even if the lane-indicating lines are curved, the change of the helix angle (i.e. pitch angle) or the movement in the upper-lower direction of the vehicle can be exactly detected, based on the change of the interval between two lane-indicating lines in the X-Z plane coordinate system so that the position or attitude of the vehicle in the traffic lane can be exactly detected.

As described above, the present invention has been described in detail in terms of preferred embodiments. However, it will be apparent to those skilled in the art that the present invention is not limited by the embodiments, and consequently numerous variations and modifications may be made within the scope of the invention, as set forth in the following claims.

What is claimed is:

1. An image processing apparatus for use with a vehicle, which is to be carried on the vehicle, said apparatus comprising:

an image pick-up device operable to photograph a foreground in a vehicle-moving direction to generate an original image data which corresponds to the foreground;

an outline extracting device operable to extract an outline image data from the original image data generated by said image pick-up device, the outline image data corresponding to outlines of two lane-indicating lines formed respectively at both end portions of a width of a traffic lane on a road, on which the vehicle is moving;

a coordinate transforming device operable to perform a coordinate-transforming processing to the outline image data generated by said outline extracting device to generate coordinate-transforming image data which represents a plan view of the outlines of the lane-indicating lines in a predetermined plane coordinate system; and an attitude change detecting device operable to detect a change of a pitch angle of the vehicle based on the two lane-indicating lines being parallel to each other, by using the coordinate-transforming image data generated by said coordinate transforming device, wherein:

said attitude change detecting device is operable to plot a plurality of points onto the plane coordinate system based on the coordinate-transforming image data, a position of each of the points in the first coordinate axis corresponding to a size in width of the traffic lane, and a position of the point in the second coordinate axis corresponding to a position in a longitudinal direction of the traffic lane; and said attitude change detecting device is further operable to decide one straight line which matches the points.

2. The image processing apparatus according to claim 1, wherein;

said plane coordinate system used by said coordinate transforming device is a plane coordinate in which a position of said image pick-up device is defined as an origin in a view point of plane, a width direction of the vehicle is defined as a first coordinate axis, and a front-rear direction of the vehicle is defined as a second coordinate axis; and said attitude change detecting device is further operable to detect the change of the pitch angle based on the inclination angle of the straight line against the second coordinate axis.

3. The image processing apparatus according to claim 2, wherein said attitude change detecting device is operable to detect an amount of movement of the vehicle in an upper-lower direction based on the straight line.

4. The image processing apparatus according to claim 1, further comprising a target direction detecting device operable to detect a target direction to advance the vehicle in consideration of the change of the pitch angle.

5. The image processing apparatus according to claim 2, further comprising a target direction detecting device operable to detect a target direction to advance the vehicle in consideration of the change of the pitch angle.

6. The image processing apparatus according to claim 3, further comprising a target direction detecting device operable to detect a target direction to advance the vehicle in consideration of both of the change of the pitch angle and the amount of movement in the upper-lower direction.

7. The image processing apparatus according to claim 2, wherein said attitude change detecting device is operable to judge outline points deviating from the straight line to be noises.

8. The image processing apparatus according to claim 3, wherein said attitude change detecting device is operable to judge outline points deviating from the straight line to be noises.

9. The image processing apparatus according to claim 1, wherein said outline extracting device includes:

an edge extracting device operable to emphasize edges of the traffic lane in the original image data generated by said image pick-up device;

a threshold setting device operable to set a threshold to extract the edges of the traffic lane based on the result detected by said edge extracting device;

an outline point extracting device operable to extract a pixel, whose intensity is a peak value, from pixels of the edges of the traffic lane, as an outline point data of the lane-indicating lines, based on both the result detected by said edge extracting device and the threshold set by said threshold setting device; and a lane-indicating line detecting device operable to perform an interpolation processing to the outline point data extracted by said outline point extracting device to generate the outline image data which corresponds to the outline of the lane-indicating lines.

10. The image processing apparatus according to claim 2, wherein said outline extracting device includes:

an edge extracting device operable to emphasize edges of the traffic lane in the original image data generated by said image pick-up device;

a threshold setting device operable to set a threshold to extract the edges of the traffic lane based on the result detected by said edge extracting device;

an outline point extracting device operable to extract a pixel, whose intensity is a peak value, from pixels of the edges of the traffic lane, as an outline point data of the lane-indicating lines, based on both the result detected by said edge extracting device and the threshold set by said threshold setting device; and a lane-indicating line detecting device operable to perform an interpolation processing to the outline point data extracted by said outline point extracting device to generate the outline image data which corresponds to the outline of the lane-indicating lines.

11. The image processing apparatus according to claim 3, wherein said outline extracting device includes:

an edge extracting device operable to emphasize edges of the traffic lane in the original image data generated by said pick-up device;

a threshold setting device operable to set a threshold to extract the edges of the traffic lane based on the result detected by said edge extracting device;

an outline point extracting device operable to extract a pixel, whose intensity is a peak value, from pixels of the edges of the traffic lane, as an outline point data of the lane-indicating lines, based on both the result detected by said edge extracting device and the threshold set by said threshold setting device; and a lane-indicating line detected device operable to perform an interpolation processing to the outline point data extracted by said outline point extracting device to generate the outline image data which corresponds to the outline of the lane-indicating lines.

12. The image processing apparatus according to claim 4, wherein said outline extracting device includes:

an edge extracting device operable to emphasize edges of the traffic lane in the original image data generated by said image pick-up device;

a threshold setting device operable to set a threshold to extract the edges of the traffic lane based on the result detected by said edge extracting device;

an outline point extracting device operable to extract a pixel, whose intensity is a peak value, from pixels of the edges of the traffic lane, as an outline point data of the lane-indicating lines, based on both the result detected by said edge extracting device and the threshold set by said threshold setting device; and a lane-indicating line detecting device operable to perform an interpolation processing to the outline point data extracted by said outline point extracting device to generate the outline image data which corresponds to the outline of the lane-indicating lines.

13. The image processing apparatus according to claim 5, wherein said outline extracting device includes:

an edge extracting device operable to emphasize edges of the traffic lane in the original image data generated by said image pick-up device;

a threshold setting device operable to set a threshold to extract the edges of the traffic lane based on the result detected by said edge extracting device;

an outline point extracting device operable to extract a pixel, whose intensity is a peak value, from pixels of the edges of the traffic lane, a an outline point data of the lane-indicating lines, based on both the result detected by said edge extracting device and the threshold set by said threshold setting device; and a lane-indicating line detecting device operable to perform an interpolation processing to the outline point data extracted by said outline point extracting device to generate the outline image data which corresponds to the outline of the lane-indicating lines.

14. The image processing apparatus according to claim 6, wherein said outline extracting device includes:

an edge extracting device operable to emphasize edges of the traffic lane in the original image data generated by said image pick-up device;

a threshold setting device operable to set a threshold to extract the edges of the traffic lane based on the result detected by said edge extracting device;

an outline point extracting device operable to extract a pixel, whose intensity is a peak value, from pixels of the edges of the traffic lane, as an outline point data of the lane-indicating lines, based on both the result detected by said edge extracting device and the threshold set by said threshold setting device; and a lane-indicating line detecting device operable to perform an interpolation processing to the outline point data extracted by said outline point extracting device to generate the outline image data which corresponds to the outline of the lane-indicating lines.

15. The image processing apparatus according to claim 7, wherein said outline extracting device includes:

an edge extracting device operable to emphasize edges of the traffic lane in the original image data generated by said image pick-up device;

a threshold setting device operable to set a threshold to extract the edges of the traffic lane based on the result detected by said edge extracting device;

an outline point extracting device operable to extract a pixel, whose intensity is a peak value, from pixels of the edges of the traffic lane, as an outline point data of the lane-indicating lines, based on both the result detected by said edge extracting device and the threshold set by said threshold setting device; and a lane-indicating line detecting device operable to perform an interpolation processing to the outline point data extracted by said outline point extracting device to generate the outline image data which corresponds to the outline of the lane-indicating lines.

16. The image processing apparatus according to claim 8, wherein said outline extracting device includes:

an edge extracting device operable to emphasize edges of the traffic lane in the original image data generated by said image pick-up device;

a threshold setting device operable to set a threshold to extract the edges of the traffic lane based on the result detected by said edge extracting device;

an outline point extracting device operable to extract a pixel, whose intensity is a peak value, from pixels of the edges of the traffic lane, as an outline point data of the lane-indicating lines, based on both the result detected by said edge extracting device and the threshold set by said threshold setting device; and a lane-indicating line detecting device operable to perform an interpolation processing to the outline point data extracted by said outline point extracting device to generate the outline image data which corresponds to the outline of the lane-indicating lines.

* * * * *

UNITED STATES PATENT AND TRADEMARK OFFICE
CERTIFICATE OF CORRECTION

PATENT NO. : 6,546,118 B1
DATED : April 8, 2003
INVENTOR(S) : Atsushi Iisaka et al.

It is certified that error appears in the above-identified patent and that said Letters Patent is hereby corrected as shown below:

<u>Title page,</u>
Item [73], Assignee, change "Matsushita Electronic Industrial Co., Ltd." to
-- Matsushita Electric Industrial Co., Ltd. --.

Signed and Sealed this

Sixteenth Day of September, 2003

JAMES E. ROGAN
*Director of the United States Patent and Trademark Office*